Aug. 25, 1964  N. CORDIS  3,145,729
INSTANT ACTION VALVE AND RESERVOIR CONTROL THEREFOR
Filed Jan. 31, 1962
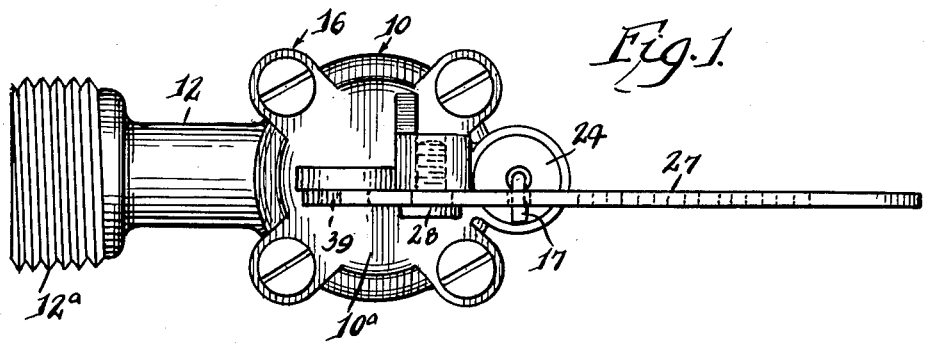
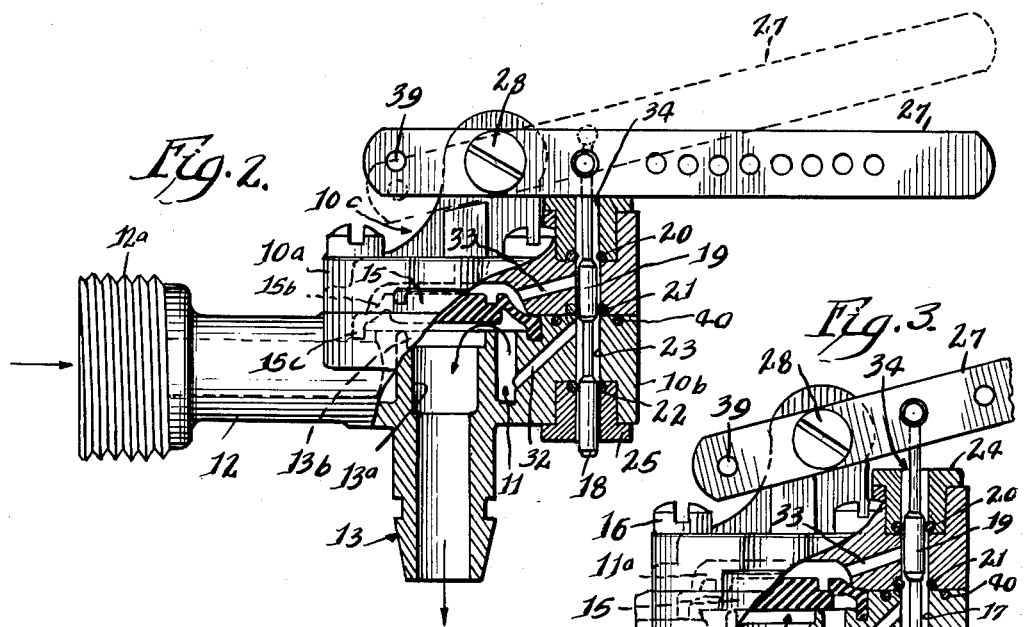
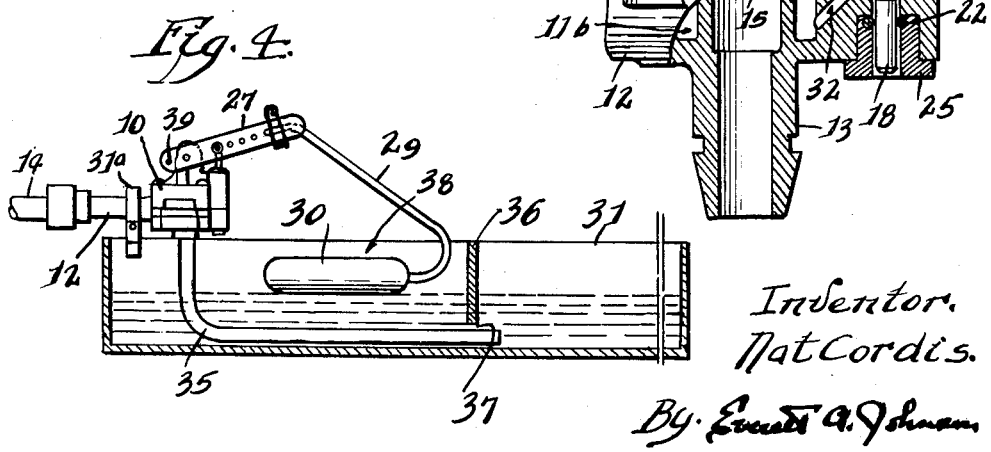
Inventor.
Nat Cordis.
By. Everett A. Johnson,
Attorney.

3,145,729
INSTANT ACTION VALVE AND RESERVOIR
CONTROL THEREFOR
Nat Cordis, Silver Lake, Wis.; Gladys S. Cordis, executrix of Nat Cordis, deceased, assignor of two-thirds to Carl F. Jensen and one-third to Gerald T. Dobie, both of Crown Industries, Chicago, Ill.
Filed Jan. 31, 1962, Ser. No. 170,047
9 Claims. (Cl. 137—414)

This invention relates to flow control devices, and, more particularly, to devices wherein a liquid level is constantly maintained by a valve responsive to the quantity of the liquid in a reservoir. More particularly, it relates to poultry watering devices embodying such valves to control a water supply conduit.

In poultry husbandry it is necessary to supply clear drinking water and to hold selected water levels in troughs regardless of water line pressure or size of flock and demand.

It is therefore an object of the invention to provide a quantity-responsive valve means which is quick acting and may depend upon a float or weight control. A further object of the invention is to provide a valve and control therefor which is adapted to provide a desired water level in troughs regardless of water supply pressure or the speed at which water is removed from the trough. These and other objects of the invention will become more apparent as my description thereof proceeds.

By this invention, I provide a valve means which is a quick-acting, full-flow valve actuated by the weight or level of the water in the trough. When the trough is lightened or the level lowered by consumption of water, the controls are moved into valve-opening position. This permits water to enter the trough with a flushing action until the necessary quantity of water is attained when the normally-closed valve closes and again shuts off the flow of water into the trough.

Further details and advantages of the invention will be described by reference to the accompanying drawing wherein:

FIGURE 1 is a top plan view;
FIGURE 2 is an elevation partly in section showing the valve in its opened position;
FIGURE 3 is an enlarged section of the valve in FIGURE 2 in its normally closed position; and
FIGURE 4 is an elevation partly in section of trough embodying the valve.

Referring to the drawing, the valve 10 includes a housing having a valve chamber 11 with which the inlet 12 and the outlet 13 communicates. The inlet comprises a threaded portion 12a to which a hose or supply line 14 may be attached as shown in FIGURE 4. The outlet 13 terminates in a tubular portion 13a projecting into the valve chamber 11.

A flexible diaphragm 15 divides the valve chamber 11 in a first sub-chamber 11a and a second sub-chamber 11b. The diaphragm 15 has a massive central plug portion 15a, an annular elastic portion 15b which urges the plug portion 15a over the seat 13b of the outlet 13, and peripheral portion 15c which is clamped between the two housing sections 10a and 10b by the screws 16.

It will be appreciated that whether the diaphragm 15 is on the outlet valve seat 13b, as shown in FIGURE 3, or raised, as shown in FIGURE 2, will control the flow through the valve.

The diaphragm 15 in turn is positioned by shifting the plunger 17 having a plug 18 and a plug 19 which co-act with O-rings 20, 21, and 22 in bore 23 being provided at opposite ends with end bushings 24 and 25 securing O-rings 20 and 22. O-ring 21 is held by the housing sections 10a and 10b.

The plunger 17 is coupled to the lever 27 which is journaled to the housing 10 by bushing screw 28. A float 30 is fixed to lever 27 by arm 29, as shown in FIGURE 4. As the water level drops in trough 31 (the valve 10 is supported on the trough 31 by a suitable bracket 31a), the float 30 follows the level until the lever 27 assumes the position in FIGURE 2. At this time the plug 19 and O-ring 21 cooperate to seal the duct 32 and vent duct 33 is open through end bushing 24. Line pressure applied to the lower portion 15b and then 15a of diaphragm 15 raises the diaphragm, as shown in FIGURE 2.

As the water level is restored the float 30 rises and establishes the position of lever 27, as shown in FIGURE 3. Here the plug 18 on plunger 17 cooperates with O-ring 20 in end bushing 24 to close the vent 34 and establish pressure communication via duct 33 and the bore 23 and duct 32 with the sub-chamber 10b above the diaphragm 15. The pressure being equalized on the diaphragm 15, it assumes its normally closed position of FIGURE 3; and thereafter the relatively large area of the upper side maintains the seal with seat 13b.

The assembly in FIGURE 4 includes a discharge hose 35 attached to the outlet 13 and is disposed along the bottom of the trough to enhance the flushing action. A baffle 36 having hose port 37 will prevent localized level increase and minimize "hunting" by the float 30. However, during delivery through hose 35 into the trough, water flows under the baffle 36 and establishes a corresponding level in the baffled float chamber 38.

The drawings illustrate my invention in terms of a float-operated or level-responsive apparatus, but it will be apparent that my quantity-responsive valve can be actuated by the weight of the water in the trough. In that event, a hanger (not shown) is provided between the trough 31 and the hanger support 39 on the lever 27, bracket 31a and float 30 having been removed.

Although the invention has been described with respect to certain embodiments thereof, these have been by way of example and it is contemplated that those skilled in the art will make modifications therein without departing from the invention which is not necessarily limited to the illustrated examples.

What I claim is:

1. A valve providing on-off control which comprises a housing, a valve chamber, a flexible diaphragm dividing said chamber into a first sub-chamber and a second sub-chamber, an inlet to said housing and said valve chamber, an outlet extending into said second sub-chamber and adapted to be closed by said diaphragm, a valved vent communicating with said first sub-chamber, a valved pressure line between said first and second sub-chambers, dual port means in fluid communication with said vent and with said pressure line, a plunger plug means shiftable between said dual port means and controlling said vent and pressure lines, said plunger plug means having upper and lower dual plugs in axial alignment, and shifting means operatively connected to said plunger for shifting said plunger between two extreme positions whereby said first sub-chamber is alternately vented to the atmosphere or maintained under line pressure thereby to position said diaphragm and control flow through said valve.

2. The valve of claim 1 wherein said shifting means includes a lever coupled to said plunger and means for positioning said lever includes responsive means responsive to the quantity of fluid in a reservoir into which said outlet discharges, said responsive means including a segregated zone of the reservoir, means shiftable in accordance with the quantity of fluid in said zone, and means providing fluid communication between said zone and said reservoir whereby the effect of transient and local level fluctuations in the reservoir during the filling operation is minimized.

3. A quick-acting full-flow valve comprising a housing, a valve chamber in said housing, an inlet to said housing, an outlet from said housing, diaphragm means in said valve chamber disposed between said inlet and outlet, said outlet and inlet being axially transverse with said outlet extending into said valve chamber, said diaphragm closing said outlet and having a peripheral portion exposed to said inlet, shiftable pilot valve means in said housing exterior of said chamber, plunger means comprising spaced upper and lower dual plugs in axial alignment, a first pressure duct between said valve chamber and a lower portion of said pilot valve means, a second pressure duct between said chamber above said diaphragm and an upper portion of said pilot valve, a vent from said pilot valve, said vent and said second pressure duct being controlled by the upper of dual plugs, and lever means coupled to said plunger means, said lever means being positioned by the quantity of water in a reservoir, whereby the diaphragm is alternately lifted by the inlet line pressure when the diaphragm is vented and is depressed by line pressure diverted through said second duct to the upper surface of said diaphragm when the first and second pressure ducts are cut off from each other and said vent and said second pressure duct are in fluid communication.

4. A diaphragm valve comprising a housing, an inlet and an outlet for said housing, a control chamber in said housing, a diaphragm across said chamber, said outlet comprising a tubular member projecting into said housing and terminating at said diaphragm, diaphragm control means in said housing including a valved vent to the total upper surface of said diaphragm and a valved pressure line from said inlet to the said upper surface of said diaphragm, dual port means in fluid communication with said vent and with said pressure line, a plunger means having upper and lower dual plugs in axial alignment and shiftable between said dual port means and controlling said vent and pressure line whereby closing said vent applies the line pressure to the upper surface of said diaphragm permitting the normally closed diaphragm to seat and whereby the relative areas of the upper and lower surfaces of said diaphragm exposed to the line pressure retains the outlet closed until the control chamber above the diaphragm is vented and line pressure removed therefrom whereupon the diaphragm is lifted and full flow results.

5. The valve of claim 4 which includes a lever on said housing, said lever being coupled to said plunger means, and float means fixed to said lever.

6. A valve apparatus comprising a valve housing, said housing having an inlet and an outlet, a diaphragm within said housing disposed between said inlet and said outlet, said diaphragm being adapted to normally close said outlet, fluid access conduit means communicating between said inlet and the top of said diaphragm, fluid pressure being exerted on said diaphragm through said access conduit means, said fluid access conduit means including dual port means, upper and lower dual plug means in axial alignment and controlling said dual port means, said plug means being shiftable by lever means exterior of said housing and coupled to said plug means and said lever means being positioned in response to the depletion of fluid in a reservoir into which said outlet discharges whereby said plug means is shifted to vent the diaphragm whereby the line pressure raises the diaphragm and permits full flow from said inlet through said outlet.

7. The valve apparatus of claim 6 which includes a reservoir, said reservoir being divided into a float chamber and a distribution chamber, means to suport said housing, a float within said float chamber, linkage means between said float and said lever means whereby decreased quantity of fluid in the said reservoir shifts the dual plug into register with the vent and intercepts the line pressure to raise the diaphragm and expose the outlet.

8. In combination with an elongated watering trough, said trough including a float chamber and a water distribution trough, a water-supply conduit, a discharge conduit delivering water into said distribution trough, fluid communication means between said chamber and said distribution trough, a quick-acting full-flow diaphragm valve means above the bottom of said float chamber and between said conduits, dual fluid circuit means alternately applying line pressure and atmospheric presure to the top of the diaphragm in said valve means, and valve control means including plunger means having upper and lower dual plugs in axial alignment, said plunger means alternately intercepting portions of said dual circuit and actuated by the quantity of water in said chamber whereby when the quantity of water in said chamber decreases, the valve will be actuated to cause a quick full flow of water into said distribution trough.

9. The apparatus of claim 8 wherein said valve control means includes a pivoted beam to position said plunger, and float means operating in said chamber.

References Cited in the file of this patent

UNITED STATES PATENTS

| | | |
|---|---|---|
| 351,852 | Coglizer | Nov. 2, 1886 |
| 1,248,650 | Gustafson | Dec. 4, 1917 |
| 1,521,745 | Becker | Jan. 6, 1925 |

FOREIGN PATENTS

| | | |
|---|---|---|
| 303,658 | Great Britain | Jan. 10, 1929 |
| 503,918 | Great Britain | Apr. 13, 1939 |
| 81,737 | Sweden | Oct. 16, 1934 |